US007179167B2

(12) United States Patent
deKeller

(10) Patent No.: US 7,179,167 B2
(45) Date of Patent: Feb. 20, 2007

(54) METHOD AND GAME DEVICE FOR PLAYING KENO OR A LOTTERY

(76) Inventor: David deKeller, Sweet Valley Farm, Soetviei Ave., Constantia, Cape Town (ZA) 7800

( * ) Notice: Subject to any disclaimer, the term of this patent is extended or adjusted under 35 U.S.C. 154(b) by 731 days.

(21) Appl. No.: 10/175,598

(22) Filed: Jun. 18, 2002

(65) Prior Publication Data

US 2003/0017867 A1 Jan. 23, 2003

Related U.S. Application Data

(60) Provisional application No. 60/299,805, filed on Jun. 20, 2001.

(51) Int. Cl.
*G06F 17/00* (2006.01)
*G06F 19/00* (2006.01)

(52) U.S. Cl. ............................ 463/18; 463/16; 463/17; 463/19; 463/20; 463/25; 273/138.1

(58) Field of Classification Search .................. 463/18
See application file for complete search history.

(56) References Cited

U.S. PATENT DOCUMENTS 5,651,735 A * 7/1997 Baba .......................... 463/18
5,935,002 A * 8/1999 Falciglia ..................... 463/19
6,126,542 A * 10/2000 Fier ........................... 463/16
6,234,897 B1 * 5/2001 Frohm et al. ................ 463/20
6,309,299 B1 * 10/2001 Weiss ......................... 463/20
6,368,212 B1 * 4/2002 Moody ........................ 463/13
6,368,213 B1 * 4/2002 McNabola ................... 463/18
6,506,118 B1 * 1/2003 Baerlocher et al. .......... 463/25

* cited by examiner

*Primary Examiner*—John M. Hotaling, II
*Assistant Examiner*—Milap Shah
(74) *Attorney, Agent, or Firm*—Robert Ryan Morishita; Morishita Law Firm, LLC

(57) ABSTRACT

A game method and device is set forth where a player makes a wager and selects numbers from a field or universe of numbers as in Keno or the Lottery. The outcome numbers are selected and compared to the player's selections and any matches are indicated. Based upon the number of matches, the player may win a prize. The player may then select a second set, including any matches from the prior comparison, and play a second round. The second set is compared to the outcome set, matches are noted based upon the number of matches a prize may be awarded. Additional rounds may be played. At the conclusion of the game the outcome set is revealed.

56 Claims, 4 Drawing Sheets

Sample Table for First Draw of 6 from 49

| One Draw: | Prob | 1 in: | If Payout: | Expected |
|---|---|---|---|---|
| | | | | |
| 6 correct | 0.000000072 | 13983816 | 1000000 | 0.071511 |
| 5 correct | 0.000018450 | 54201 | 20000 | 0.368980 |
| 4 correct | 0.000968620 | 1032 | 200 | 0.192755 |
| 3 correct | 0.017650404 | 57 | 15 | 0.247106 |
| 2 correct | 0.132378029 | 7.6 | 0 | -0.132378 |
| 1 correct | 0.413019450 | 2.4 | 0 | -0.413019 |
| 0 correct | 0.435964976 | 2.3 | 0 | -0.435965 |
| | 1.000000000 | | | -0.101011 |

| | |
|---|---|
| Edge: | 10.10% |

Sample Table for Second Draw

| One Draw: | Prob | 1 in: | If Payout: | Expected |
|---|---|---|---|---|
| | | | | |
| 6 correct | 0.000004505 | 221965 | 100000 | 0.450516 |
| 5 correct | 0.000542341 | 1844 | 500 | 0.270628 |
| 4 correct | 0.012726140 | 79 | 15 | 0.178166 |
| 3 correct | 0.100652068 | 9.9 | 0 | -0.100652 |
| 2 correct | 0.317430521 | 3.2 | 0 | -0.317431 |
| 1 correct | 0.402396170 | 2.5 | 0 | -0.402396 |
| 0 correct | 0.166248183 | 6.0 | 0 | -0.166248 |
| | 0.999999928 | | | -0.087416 |

| | |
|---|---|
| Edge: | 8.74% |

Sample Table for Third Draw

| One Draw: | Prob | 1 in: | If Payout: | Expected |
|---|---|---|---|---|
| | | | | |
| 6 correct | 0.000047555 | 21028 | 10000 | 0.475502 |
| 5 correct | 0.003753482 | 266 | 50 | 0.183921 |
| 4 correct | 0.051813110 | 19 | 5 | 0.207252 |
| 3 correct | 0.232352886 | 4.3 | 0 | -0.232353 |
| 2 correct | 0.398235718 | 2.5 | 0 | -0.398236 |
| 1 correct | 0.261140307 | 3.8 | 0 | -0.261140 |
| 0 correct | 0.052652366 | 19.0 | 0 | -0.052652 |
| | 1.000000000 | | | -0.077706 |

| | |
|---|---|
| Edge: | 7.77% |

*FIG. 1*

FAST ACTION KENO - PAYTABLE

| Numbers Chosen | 15 | 32 | 47 | 1 | 17 | 22 | 1st Selection | 2nd Selection | 3rd Selection | 4th Selection |
|---|---|---|---|---|---|---|---|---|---|---|
| 6 | | | | | | | 6 pays 1000 | 6 pays 20 | 6 pays 11 | 6 pays 10 |
| 6 | | | | | | | 5 pays 100 | 5 pays 4 | 5 pays 2 | 5 pays 1 |
| 6 | | | | | | | 4 pays 8 | 4 pays 2 | 4 pays 1 | |
| 6 | | | | | | | 3 pays 2 | 3 pays 1 | | |
| 5 | | | | | | | 5 pays 500 | 5 pays 30 | 5 pays 12 | |
| 5 | | | | | | | 4 pays 30 | 4 pays 3 | 4 pays 2 | |
| 5 | | | | | | | 3 pays 3 | 3 pays 1 | | |
| 4 | | | | | | | 4 pays 100 | 4 pays 24 | 4 pays 8 | |
| 4 | | | | | | | 3 pays 9 | 3 pays 1 | | |
| 4 | | | | | | | 2 pays 1 | | | |
| 3 | | | | | | | 3 pays 45 | 3 pays 12 | | |
| 3 | | | | | | | 2 pays 2 | | | |
| 2 | | | | | | | 2 pays 15 | 2 pays 5 | | |
| 1 | | | | | | | 1 pays 3 | | | |

*FIG. 3*

CUMULATIVE version

Sample Table for First Draw of 6 from 49

| One Draw: | Prob | 1 in: | If Payout: | Expected | Hit Frequency |
|---|---|---|---|---|---|
| 6 correct | 0.000000072 | 13983816 | 1000000 | 0.071511 | |
| 5 correct | 0.000018450 | 54201 | 5000 | 0.092231 | |
| 4 correct | 0.000968620 | 1032 | 20 | 0.018404 | |
| 3 correct | 0.017650404 | 57 | 5 | 0.070602 | |
| 2 correct | 0.132378029 | 7.6 | 2 | 0.132378 | |
| 1 correct | 0.413019450 | 2.4 | 1 | 0.000000 | 56.4% |
| 0 correct | 0.435964976 | 2.3 | 0 | -0.435965 | |
| | 1.000000000 | | | -0.050839 | |

| | |
|---|---|
| Edge: | 5.08% |

Sample Table for Second Draw

| One Draw: | Prob | 1 in: | If Payout: | Expected | Hit Frequency |
|---|---|---|---|---|---|
| 6 correct | 0.000004505 | 221965 | 100000 | 0.045048 | |
| 5 correct | 0.000542341 | 1844 | 250 | 0.135043 | |
| 4 correct | 0.012726140 | 79 | 10 | 0.114535 | |
| 3 correct | 0.100652068 | 9.9 | 3 | 0.201304 | |
| 2 correct | 0.317430521 | 3.2 | 1 | 0.000000 | 43.1% |
| 1 correct | 0.402396170 | 2.5 | 0 | -0.402396 | |
| 0 correct | 0.166248183 | 6.0 | 0 | -0.166248 | |
| | 0.999999928 | | | -0.072714 | |

| | |
|---|---|
| Edge: | 7.27% |

Sample Table for Third Draw

| One Draw: | Prob | 1 in: | If Payout: | Expected | Hit Frequency |
|---|---|---|---|---|---|
| 6 correct | 0.000047555 | 21028 | 10000 | 0.475502 | |
| 5 correct | 0.003753482 | 266 | 20 | 0.071316 | |
| 4 correct | 0.051813110 | 19 | 3 | 0.103626 | |
| 3 correct | 0.232352886 | 4.3 | 1 | 0.000000 | 28.8% |
| 2 correct | 0.398235718 | 2.5 | 0 | -0.398236 | |
| 1 correct | 0.261140307 | 3.8 | 0 | -0.261140 | |
| 0 correct | 0.052652366 | 19.0 | 0 | -0.052652 | |
| | 1.000000000 | | | -0.061584 | |

| | |
|---|---|
| Edge: | 6.16% |

*FIG. 4*

METHOD AND GAME DEVICE FOR PLAYING KENO OR A LOTTERY

CROSS-REFERENCE TO RELATED APPLICATION

This application is a continuation-in-part application of commonly owned and prior filed provisional patent application Ser. No. 60/299,805 filed Jun. 20, 2001 and titled "IMPROVED METHOD AND GAME DEVICE FOR PLAYING KENO OR A LOTTERY".

FIELD OF THE INVENTION

The present invention relates to methods and devices for playing a casino or wagering game such as Keno or a lottery.

BACKGROUND

The casino game of Keno is basically a numbers game like a lottery. Keno originated in China over 2000 years ago. The Chinese game incorporated 120 characters from which a wagering player could select the required selection set, e.g. six characters. The game was imported into the United States in the 1980's and was modified to the game of today where there is a field of numbers, 1–80, from which a player selects a desired player selection set of numbers, e.g. 1 to 20 numbers. The player marks the chosen numbers on a Keno ticket and makes a desired wager. From the field the game operator randomly selects an outcome set for the game of 20 numbers. The pay out to the player, if any, is based upon the amount wagered, the number of spots or numbers of the player's selection set and the total number of matches between the player selection set and the game outcome set of numbers.

In Keno there are a number of manners to mark a ticket. The most common manner is referred to as a straight ticket. For a straight ticket the player marks from 1 to 20 spots (numbers) on a Keno ticket. For example if the player marks 8 numbers, the Keno game may offer the following pay schedule:

| Matches (winning numbers) | Pay out |
|---|---|
| 0–4 | 0 (loss) |
| 5 | 9 for 1 |
| 6 | 80 for 1 |
| 7 | 1480 for 1 |
| 8 | 25,000 for 1 |

A player can also play a "Way" ticket where groups of numbers are selected. For example the player could mark on a Keno ticket three groups of 4 numbers to form, in essence, (i) three 4 spot tickets, (ii) three 8 spot tickets and (iii) one twelve spot ticket, all on the same Way ticket. Each Way requires a separately allocated wager, e.g. one dollar for each Way. This gives the player seven ways to win on a single Keno ticket.

In Keno, the selection set of 20 numbers is selected using a rotating cage or blower as is well known in the art.

In addition to the live Keno, it is also known to provide video Keno. In video Keno, an electronic device is provided whereat a player makes a wager, selects his/her spots (usually limited to 10 numbers), a random number generator selects the outcome set of 20 numbers and compares the outcome set to the selection set to determine if the player has won or lost.

Live Keno has a mathematical edge (vigourish) in favor of the house in the range of 15%–25%. This vigourish is considerably larger than other live or "pit" games such as Roulette (5.4%). The high vigourish is required to cover the costs and expenses, including employee expenses for Keno runners and game operating staff, in connection with the game and the fact that most wagers on a Keno ticket are small. Video Keno may incorporate a smaller vigourish since there are no employee expenses.

Lotteries, which are related to Keno in that they are basically a fixed number straight ticket, date back to Italy circa 1530 and were a "Pick 6 Lotto" where a player wagers and picks 6 numbers from a field of 49. The field of numbers can vary from 49 to 53 to 100. In a Lottery, players buy tickets on a pari-mutual basis. At an appointed time the Lottery administrator draws 6 numbers from the field of, for example numbers 1–49, and players win if they have a predetermined set of numbers, e.g. 3, or more matching numbers in their selection. Unlike Keno the pay outs are not fixed, at least for the larger prizes, but instead are based upon the pari-mutual pool of wagers made on the game, less any administrative costs, taxes, assessments or the like. Because Lotteries are pari-mutual in nature and it is rare that a player will hit 6 out of 6, often the jackpot is rolled over into successive games resulting in super jackpots. It is the aspect of large jackpots and super jackpots, sometimes in the range in some multi-state lotteries in the United States of $80 Millions, that draws players to the game.

Keno and Lotteries are popular since they are simple and offer large prizes which entice gamblers. A drawback, however, is that the games are, in a sense, one dimensional. Players select their numbers and wait for the outcome set. There is no interactive strategy or play to maintain the player's interest. A further drawback is that, because of the probabilities against winning, players often lose interest after a series of consecutive losses. Still further, from the viewpoint of the casino or lottery administrator, these draw single, small wagers which necessitate high vigourishes further leading players away from the games.

It would be advantageous to provide a method for play of Keno or Lottery which provides for player interaction during play, tends to increase the player's chances for winning, encourages players to make additional wagers thereby enabling the casino or administrator to reduce the vigourish to further enhance player acceptance and interest in the game.

There is further a need for a game which can be played over and through the world wide web, wireless and mobile communication devices, in a casino, at home via a computer or interactive television and based upon real or fictitious wagers.

SUMMARY OF THE INVENTION

There is, therefor, set forth according to the present invention a method and device for a player to play a game of the type where the player makes a wager and there is selected (or the player selects) from a universe of a predetermined number of indicia, e.g. 49 numbers 1–49, a subset of indicia, e.g. six numbers, defining a selection set and where a predetermined number of indicia are selected from the universe defining an outcome set and the indicia of the outcome set and selection set are compared to determine matching indicia and if a predetermined number of matches occur issuing an award to the player. The method of the present invention additionally includes concealing the outcome set from the player while showing matches from the first selection and subsequent to the comparison of the selection set and outcome set, selecting a second selection set including any matches from the comparison of the selection set and outcome set. The method further includes comparing the indicia of the second selection set to the outcome set to determine any additional matching indicia and if a predetermined number of matches occur between the outcome set and the second selection set issuing an award to the player. After the play of the second selection set and the game being over the method includes revealing the outcome set to the player for the player to confirm any matching and non-matching indicia.

According to other embodiments, the player may, after resolution of the second selection set, play one or more additional sets attempting to select indicia which match the outcome set.

The method and device may be directed to games where numbers are selected such as Keno or a Lottery or other like types of games.

BRIEF DESCRIPTION OF THE DRAWINGS

These and other features and advantages of the present invention will become appreciated as the same becomes better understood with reference to the specification, claims and drawings wherein:

FIG. 1 shows for a Pick 6 Lotto, examples of pays and vigourishes (edges) for sequential plays according to the present invention;

FIG. 3 shows a pay schedule for a Keno version of the game; and

FIG. 4 shows pays and vigourishes for a cumulative embodiment of the game.

DESCRIPTION

Figure 2:
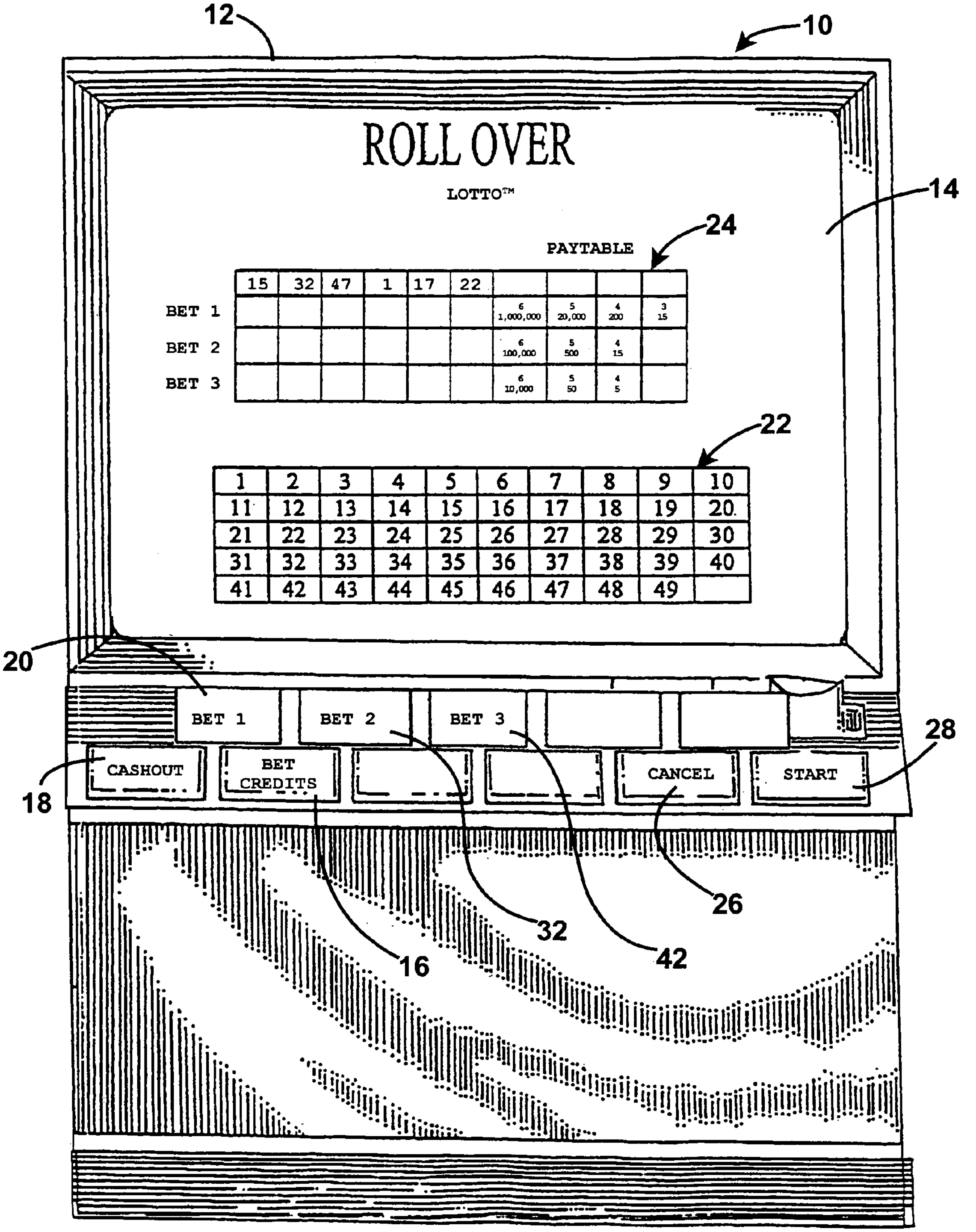
FIG. 2 shows an electronic device for playing an exemplar of a game according to the method of the present invention.

Broadly, one embodiment of the present invention is directed to an electronic device and method for playing a wagering game of the type where a player makes a wager and selects a player selection set of indicia such as numbers from a game universe field of numbers and where an outcome set of numbers from the is universe randomly selected and compared to the player selection set to determine if the player has won or lost his wager. Thus the various embodiments of the present invention are directed to Lottery and Keno types of games.

Line by Line

This embodiment of method and device of the present invention will be described with reference to a video Lottery, Pick 6 (commonly referred to as a PIC 6 Lotto) game with reference made to FIGS. 1 and 2. With reference to FIG. 2, an electronic device 10 is provided which includes a computer processor (not shown) to control the operation and progress of the game housed in a housing 12 which also mounts a video display 14. By touch screen technology on the display 14 or disposed on the housing 12 in association with the display 14, are buttons by which the player can control play according to the method of the present invention. Also provided on the housing 14 (not shown) are means for receipt and acknowledgment of deposit of a wager by the player to play the game. As is known in the art these wagering means may include a cash bill reader, credit card reader, token acceptor or other means by which the player may enter wagers. The accumulated amount available for wagering is noted by the processor and displayed as credits, in a manner known to those skilled in the art. Thus to enter a wager the player may touch Bet Credits button 16. To enter multiple credits as wagers, the player would repetitively touch button 16. To cash out accumulated credits, a cash out button 18 is provided which, if depressed, prompts the processor to issue pay outs of the accumulated credits to the player.

To play the PIC 6 Lotto for the device 10, the player enters a first wager.

To do so, the player depresses Bet 1 button 20 and, with button 16, enters the desired wager to be initially made, e.g. 5 credits. The player then selects his/her first player selection set of 6 numbers from the universe of numbers for the game. As shown in FIG. 2, the universe field of numbers is numbers 1 through 49. For example the player may select the numbers of "15, 32, 47, 1, 17 and 22" as the initial player selection set S1. This selection may be made by displaying at the display 14 a matrix 22 of the universe of numbers and by the player touching the touch screen display 14 over the desired number. The player's initial selection set may be displayed in a player selection matrix 24 displayed above the matrix 22. As shown in FIG. 2, the player selection matrix 24 has three rows denominated "Bet 1, Bet 2 and Bet 3" and 10 columns, six of which show the player's selection set(s) with the remainder showing the pay outs. With reference to the first row, of the matrix 24 and the First Draw Table from FIG. 1, it is seen that if the player matches his six numbers of the first player selection set to the six numbers drawn (as hereinafter described), he will receive a pay of 1,000,000:1. If the player matches only 5 out of six, the pay out will be 20,000:1, for 4 out of six the pay out would be 200:1 and for 3 out of six the pay out would be 15:1. For fewer than 3 matches, there is no pay out.

If the player, before play, wants to change his selection, he would depress the cancel button 26 which would cancel the selections for the first player selection set and permit the player to start over.

If the player is satisfied with his six numbers of the first selection set, the player depresses the Start button 28 to start play. The processor, using a random number generator program, randomly selects six numbers from the field of numbers 1–49 representing an outcome set of numbers. These numbers are not revealed to the player until the game is over. The processor also compares the outcome set of numbers to the player's first selection set S1 to determine if any numbers match. For example, if the outcome set of numbers were "5, 9, 17, 32, 37 and 49" (as yet unrevealed to the player), the processor would determine that two of the players first selection set S1 of numbers match the outcome set (numbers "17" and "32"). In the Bet 1 row of the player selection matrix 24, a mark or other indicator would be provided under the numbers "17" and "32" to indicate to the player that he had two hits (matches) from his first selection set S1. The matching numbers may also be indicated in matrix 22 by colors, flashing background or the like.

At this point, and with traditional Lottery, the game would be over and the player would have lost the game. Receiving only two matches is typically determined to be a loss. According to the example of the pay schedule for this embodiment of the present invention (First Draw Table) the first player selection set S1 was a loss. As described below, different pay schedules may be adopted.

According to the game of the present invention, however, the player has the option to place a second wager and to select a second selection set S2 including the numbers "17" and "32", which the player knows are contained in the outcome set. For purposes of illustration, it will be assumed that the player enters a second wager by depressing Bet 2 button 32, wagers credits and selects a second player selection set S2 of the following numbers "5, 32, 10, 36, 17 and 49" and depresses the Start button 28. The second selection set S2 would be displayed in the player selection matrix 24. In this regard, the prior matching numbers of "17" and "32" may be locked in so that the player is compelled to select prior matching numbers to avoid the player making a mistake. The processor would compare the numbers of the second selection set S2 to the outcome set of numbers and again note in the player selection matrix 24 any matches. According to this example the player has four matches, numbers "17", "32" (initial matching numbers), and new matching numbers "5" and "49". Based upon the Table for the Second Draw (FIG. 1), and the player having four matches, he has won a pay out of 15:1 (×2) based upon the aggregate amount of his first and second wagers. At this point the player can opt to take his pay out or to place a third wager. If the player elects to cash out, they would depress a cash out button 18 and the payout would be made to the player. At the same time the outcome set of numbers would be displayed at the matrix 22 for the player to see and confirm. If, instead, the player wishes to continue play he can make a third wager by depressing the Bet 3 button 42 and entering the wager. The player, now knowing four of the six numbers (17, 32, 5 and 49) of the outcome set, would select a third player selection set S3 of numbers, for example, "5, 9, 17, 32, 35 and 49". The player third selection set S3 would be displayed at the player selection matrix 24. Again, the prior matching numbers may be locked in so the player does not make a mistake. By depressing the Start button 28, the processor compares the third player selection set S3 with the outcome set as well as displays the outcome set at matrices 22 and 24. For the example provided, the processor would note and display at the player selection matrix 24 that the player has five matching numbers, "5, 9, 17, 32 and 49". The matching numbers can be displayed as well on the matrix 22. The player would win, based upon the aggregated first, second and third wagers, a pay out of 50:1 (See the Table for the Third Draw, FIG. 1).

As can be seen, the player has options of placing at least a second wager and that the wagers may be based upon information concerning the partial composition of the outcome set of numbers. Thus, multiple wagers may be received for each game. Because multiple wagers can be received, the casino or administrator may reduce the per game vigourish providing higher and/or more frequent pay outs to players as well as receive higher revenues for the game by adjusting the pay schedule.

As can further be appreciated by comparing the Tables of FIG. 1, the pay outs are reduced as more information may be imparted to the player. Thus the overall vigourish for the game is maintained within desired limits. Pay outs may be adjusted to adjust the vigourish based upon the knowledge of the known matching numbers as the player wagers on at least a second round.

There may also be game terminating outcomes, e.g. where the player hits 6 out of 6 on the first draw to prevent the player from making the second and third wagers where winning is assured. Game termination may also occur if a second selection set does not yield an additional winning number match.

The foregoing game and method may also be applied to Keno where the field of numbers is 1–80 and where the outcome set is twenty randomly selected numbers from the field. With reference to FIG. 3, an example of a pay schedule is provided for a game where the player selection set is from 1 to 6 numbers. FIG. 3 may represent the matrix 24 on the electronic device 10. For example, if the player selects only one number, e.g. "15" and that number is in the twenty number outcome set, the player is paid 3:1 for their wager. If the player selection set includes 6 numbers, the player would be paid based upon their first wager and according to the number of matches referenced in the column of FIG. 3 denoted "1$^{st}$ Selection. The player (unless all 6 of the numbers of the initial set are matched) can make a second wager and the player would be paid according to the second column denoted "2$^{nd}$ Selection" times the total amount of the aggregated first and second wagers with that amount doubled. That is, If the player wagered 5 units for both the first and second wagers, the first wager resulted in three matches and the second resulted in 5 matches the player would be entitled to:

1. For the first wager: 5 units×2 (pay schedule)=10 Units, plus
2. For the second wager: 5 units×4 (pay schedule)=20 units for a total win of 30 units.

According to this embodiment of the present invention, the amount won in any selection set is not jeopardized by placing an additional wager and making another selection.

With continuing reference to FIG. 3, the player can make up to four successive selections. When the player does not improve the number of matches in any successive selection or matches all six numbers, the game is over and the outcome set is revealed to the player. Alternatively, by adjusting the pay schedule, play may continue without improvement for a predetermined maximum number of games, noting that through each successive round as more information is imparted to the player, i.e. known matching numbers and known non-matching numbers, the pay schedule will change to reflect the changing odds.

Cumulative

According to this embodiment (FIG. 4), the player commits initially to wagering on successive selection sets, e.g. 15 units with 5 units committed to the first selection set, 5 units to the second selection set and 5 units to the third selection set. The player would make the selection of his/her first selection set S1 and any matches with the outcome set (for example two matching numbers) are carried over to the second selection set S2 and the player can select the remaining numbers for the second selection set (for example four numbers). This procedure is repeated for each set enabled by the player's initial wager.

The selection of selection set numbers can be made by the player or by a random number generator. For example, the player may select the numbers of the first selection set and thereafter, for each successive enabled selection set, any non-matching numbers are replaced by randomly selected numbers. Further, the game may provide for the player to allocate from the initial wager the amount of the wager to be attributed to the first, second or other selections sets.

Risk/Reward

According to this embodiment of the game, if the player elects to make a second wager and attempt to make more matches with a second selection set, they would surrender (forfeit) any prize won by the first selection set. In effect they would be parlaying their prior winnings as the wager for the next selection set. In that any pay for the first selection set is surrendered by making a second wager, the pay schedule for pays in later selection sets can be improved. As but an example, a pay schedule for a PIC 6 Lotto according to this version may be as below in Table 1. It should be understood that the schedule may be adjusted to adjust the vigourish for the game.

TABLE 1

| Correct | 1st Set | 2nd Set | 3rd Set | 4th Set |
|---|---|---|---|---|
| 0 | 0 | 0 | 0 | 0 |
| 1 | 1:1 | 0 | 0 | 0 |
| 2 | 2:1 | 1:1 | 0 | 0 |
| 3 | 5:1 | 3:1 | 1:1 | 0 |
| 4 | 25:1 | 10:1 | 3:1 | 2:1 |
| 5 | 5000:1 | 250:1 | 50:1 | 20:1 |
| 6 | 1,000,000:1 | 10,000:1 | 5000:1 | 1000:1 |

The advantage according to this embodiment is that where the players perceive they can significantly improve their win, they can surrender their initial win and make the second wager.

The game can be applied to Keno or other Lottery or Lottery-type games. For Keno, the game can be applied to straight or way tickets as well. For example, a player may select a straight, 8 number Keno ticket and, by viewing the matches make serial wagers for sequential 8 spot tickets by using partial information about the outcome set gained from matching numbers in the selection sets. Further, as applied to Keno, the player may change, for the second selection set, the number of numbers for the player selection set, e.g. for the first selection set include eight numbers and for the second include only six numbers. However, the pay schedule would be adjusted to account for the decrease (or increase) of numbers in the second (or successive) selection sets and may in fact dictate that a selection set include a predetermined number of numbers. For example, if the first selection set included twenty numbers, the player may be required to include at least eight numbers in the second selection set.

As can be appreciated the method and device are well suited for video Keno and Lottery or Internet or wireless based Lottery or Keno where each player has their own outcome set for each game. The device and method are not suited to public, periodic draw Lotteries such as weekly state Lotteries, inasmuch as information could be shared among players to determine the exact composition of outcome set for the second wagers.

Still further, the game according to any version or embodiment may include a separate jackpot, including a progressive jackpot, for sequential matching of all number. That is, if the player selects, for example, "5, 9, 17, 32, 35 and 49", and those numbers are matched, during play of the game including successive selection sets, in order or in a reverse order, the jackpot would be awarded.

The game can also be applied to other Lottery-type games where, such as a pick three (sometimes referred to as a mini-lotto), the player picks three numbers for the field of the numbers 0–9, e.g. 3-4-5 and the outcome set includes three numbers randomly selected from the field. The present invention can be applied to a game wherein the player wagers on a 3-digit number between "000" and "999" and a variation thereof where the winning number is any combination of the 3-digits of the outcome set, for example "345, 354, 435, 453, 534 or 543". Or the game can be applied to a mixed lottery or Keno game such as a game where the player is attempting to match five numbers and at the same time trying to match a single number, i.e. two games in one. Further the game could be applied to a Bingo game where there are a fixed number of selections and the player is attempting to match a pattern on a Bingo card.

According to another embodiment, the player makes a cumulative wager, e.g. 15 units to play three rounds of the game. The total number of correctly selected numbers (hits) is noted for each round as is the payout applicable for each round. For example, after round 1 the player may have selected three correct numbers (three "hits") which, according to the round 1 pay table, would pay the player 2:1. After the second round the player may have four hits which, according to the second round pay table, pay at odds of 10:1. After the third and final round the player may now have still only four hits which, according to the third round pay table pay at odds of 3:1. According to this embodiment, the player would receive the benefit of the most favorable pay for the entire wager, i.e. 10:1 and thus be paid 15 units(total bet)×10=150 units. If instead the player had ended up in round 3 with five hits payable, according to the round 3 pay table at 25:1, the player would receive 15 units (total bet)×25=375 units.

The odds for each number of hits in each round can be adjusted to give the house (casino/operator of the game) a desired vigourish. The pays are reduced somewhat from the cumulative situation (where the player receives a pay for each round based upon the round's applicable pay schedule because the player is gaining the advantage of being able to choose the best situation after any of the rounds. Table 2 below sets fourth a sample of the pay tables for the rounds:

TABLE 1

| After Round 1 | | After Round 2 | | After Round 3 | |
|---|---|---|---|---|---|
| Hits | Odds | Hits | Odds | Hits | Odds |
| 0 | 0 | 0 | 0 | 0 | 0 |
| 1 | 0 | 1 | 0 | 1 | 0 |
| 2 | 1:1 | 2 | 0 | 2 | 0 |
| 3 | 2:1 | 3 | 2:1 | 3 | 1:1 |
| 4 | 20:1 | 4 | 10:1 | 4 | 3:1 |
| 5 | 1000:1 | 5 | 100:1 | 5 | 25:1 |
| 6 | 100k:1 | 6 | 1000:1 | 6 | 2500:1 |

The above table provides for a vigourish of about 6.92%.based upon a field of forty-nine numbers.

The games and methods according to the present invention maintains interest since the player can exercise strategy concerning wagering and play. Further, the second or third wagers need not be at the same level as the original wager; however, some relation, e.g. only doubling, may be provided to prevent players from making minimum wagers and increasing their wagers when they have a sure winner.

Still further, the game can include bonus numbers, e.g. a seventh number, as is known for some Lotteries. A bonus pay out can be based on all six numbers being all EVEN or all ODD numbers, or if any four or more numbers, for example, are in sequential order. The method of the present invention can include a pay table wherein winning number combinations are based on horizontal, vertical and diagonal lines, that is three numbers on three rows or six numbers on six rows. Also the field can be increased or decreased, e.g. 1–80 for Keno, and can be based upon other indicia such as selecting six cards from a deck of playing cards, or the like. Still further, progressive jackpots may be provided by interlinking Lottery/Keno game terminals.

Further, the game may be played as by providing the player with only the option to place the second wager (no third wager option) or by providing additional optional wagers, e.g. a fourth wager. For fourth or subsequent wagers, the pay tables would be adjusted accordingly.

Still further, rather than the player selecting the indicia or numbers for selection sets, the indicia may be selected by the processor. For example, the player makes a wager and the processor randomly selects the initial (first) selection set, e.g. six numbers from a universe field of forty nine numbers. After the first comparison, if the player is going to play a second round the processor would randomly select the indicia for the second selection set, incorporating any matching indicia from the comparison of the initial selection set and the outcome set. Thus the game may be played in any number of rounds with the processor configured to, for each round, carry forward any matching indicia and randomly select the remaining for the selection set.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description.

I claim:

1. A method for conducting a game for a player of the type where the player makes a wager and there is selected from a universe of a predetermined number of indicia a subset of indicia defining a selection set, a predetermined number of indicia are selected from the universe defining an outcome set and the indicia of the outcome set and selection set are compared to determine matching indicia and if a predetermined number of matches occur issuing an award to the player, the method comprising:

concealing the outcome set;

subsequent to the comparison of the selection set and outcome set, selecting a second selection set including any matches from the comparison of the selection set and the outcome set and excluding any non-matching indicia from the comparison of the selection set and the outcome set;

comparing the indicia of the second selection set to said outcome set to determine any matching indicia;

if a predetermined number of matches occur between the outcome set and the second selection set issuing an award to the player; and revealing the outcome set to the player at the end of the game.

2. The method of claim 1 further comprising receiving from the player a second wager to qualify to select the second selection set.

3. The method of claim 1 further comprising selecting a third selection set including any matches from the comparison of the outcome set and the selection set and including any matches from the comparison of the outcome set and the second selection set and excluding any non-matching indicia from the comparison of the selection set and the outcome set, comparing the indicia of the third selection set to said outcome set to determine matching indicia and if a predetermined number of matches occur between the outcome set and the third selection set issuing an award to the player.

4. The method of claim 3 further comprising receiving from the player a third wager to qualify to select the third selection set.

5. The method of claim 3 further comprising permitting the player to select the third selection set when said second selection set includes at least one match with the outcome set.

6. The method of claim 3 further comprising providing a schedule of awards based upon matches of said outcome set and said second selection set and said third selection set.

7. The method of claim 1 further comprising providing a schedule of awards based upon matches of said selection set and said second selection set.

8. The method of claim 1 further comprising permitting the player to make the selection of the second selection set upon condition that there is at least one match between the selection set and the outcome set.

9. The method of claim 1 further comprising revealing the outcome set upon conclusion of the game.

10. A method of conducting a game comprising:

(i) receiving a wager from a player to play the game and selecting from a universe field of indicia a subset of indicia defining a first selection set S1;

(ii) randomly selecting from the universe field a predetermined number of indicia defining the outcome set for the game;

(iii) comparing the indicia of the first selection set S1 and the outcome set to determine matches and if at least a predetermined minimum number of matches occur, issuing an award to the player;

(iv) the player selecting from the universe field a second selection set S2, said second selection set including at least one matching indicia determined at step (iii) and excluding any non-matching indicia determined at step (iii);

(v) comparing the indicia of the second selection set S2 and the outcome set to determine matches and if at least a predetermined minimum number of matches occur, issuing an award to the player; and (vi) at the conclusion of the game revealing the outcome set to the player.

11. A method for playing a game of the type where a player selects from a universe of numbers a subset of numbers defining a selection set, randomly selecting a subset of numbers from the universe of numbers defining an outcome set, comparing the numbers of the selection set and the outcome set for matching numbers and issuing an award based upon a predetermined minimum number of matches, the method comprising:

the player selecting a subset of numbers defining a second selection set including any matches from the comparison of the selection set and the outcome set and excluding any non-matching numbers from the comparison of the selection set and the outcome set; and comparing the numbers of the second selection set and the outcome set for matching numbers and issuing an award based upon a predetermined minimum number of matches.

12. The method of claim 11 further comprising the player opting to (1) accept the award based upon the number of matches between the selection set and the outcome set and concluding the game or (2) foregoing any award based upon matches between the selection set and the outcome set and selecting said second selection set.

13. The method of claim 11 further comprising permitting the player to make the selection of the second selection set on condition that there is at least a predetermined number of matches between the selection set and the outcome set.

14. The method of claim 11 further comprising the player selecting a subset of numbers defining a third selection set, comparing the third selection set to the outcome set for matching numbers and issuing an award based upon a predetermined number of matches.

15. A device for conducting a wagering game of the type having a display, a processor, a data storage storing data representing a universe of a predetermined number of indicia, a wager input device for a player to input a wager, a data input device fur selection by a player of a subset of indicia defining an initial selection set, a prompting device for prompting play of the game, said processor configured to, upon the input of a wager and prompting of play, randomly select an outcome set and compare the outcome set to the selection set to determine any matching indicia and if at least predetermined number of matches occur issue an award to the player, said device comprising:

said data input device configured for selection of a player second selection set of indicia subsequent to said comparison of the outcome set to the selection set, said processor configured to include matches from the comparison of the selection set and the outcome set in the second selection set and exclude any non-matching indicia from the comparison of the selection set and the outcome set, said prompting device prompting further play; and said processor configured to compare said outcome set to said second selection set and if at least a predetermined minimum number of matches occur, issue an award to the player.

16. The device of claim 15 further comprising said data input device configured to provide for selection of the second selection set only upon the input of another wager at the wager input device.

17. The device of claim 15 wherein said data stored in the data structure further comprise a first pay table defining an award structure for the comparison of the outcome set and the selection set and a second pay table defining an award structure for the comparison of the outcome set and said second selection set.

18. A device for conducting a wagering game of the type having a display, a processor, a data storage storing data representing a universe of a predetermined number of indicia, a wager input device for a player to input a wager, a data input device for selection of a player a subset of indicia defining an initial selection set, a prompting device for prompting play of the game, said processor configured to, upon the input of a wager and prompting of play, randomly selecting an outcome set and comparing the outcome set to the initial selection set to determine any matching indicia, said device comprising:

said processor configured to, if at least predetermined number of matches occur, determine a first award for the player based upon the number of matching indicia from the comparison of the initial selection set and the outcome set, said first award configured as a multiplier of said wager;

said data input device configured for selection of a player second selection set of indicia subsequent to said comparison of the outcome set to the initial selection set, said processor configured to include matches from the comparison of the initial selection set and the outcome set in the second selection set and exclude any non-matching indicia from the comparison of the initial selection set and the outcome set from the second selection set, said prompting device prompting further play;

said processor configured to compare said outcome set to said second selection set and if at least a predetermined minimum number of matches occur, determine a second award to the player, said second award configured as a multiplier of said wager; and said processor further configured to award the greater of the first or second award to the player.

19. A method of conducting a game for a player, comprising:

receiving a plurality of wagers from said player;

defining a selection set;

selecting an outcome set and concealing said outcome set from said player;

conducting a plurality of sequential draws, said wagers each associated to a draw, each said draw comprising:

comparing said selection set to said outcome set and determining the quantity of matches between said selection set and said outcome set; and defining a subsequent selection set for a subsequent sequential draw, said subsequent selection set containing any members of said selection set that matched said outcome set, if any, and excluding any non-matching members from the comparison of said selection set and said outcome set; and if said player obtains a predetermined quantity of matches, issuing an award to said player.

20. The method of claim 19 wherein said step of awarding comprises:

associating the quantity of matches obtained during the final sequential draw with payout odds; and issuing an award based on the sum of the wagers associated with all draws and the payout odds for the quantity of matches obtained for the final sequential draw.

21. The method of claim 19 wherein said step of awarding comprises:

associating the quantity of matches obtained during each draw with payout odds; and issuing an award for each draw based on the wager associated to that draw and the payout odds for the quantity of matches for that draw.

22. The method of claim 19 wherein said step of awarding comprises:

associating the quantity of matches obtained during each draw with payout odds; and issuing an award based on the sum of the wagers associated with all draws and the highest payout odds obtained during said sequence of draws.

23. The method of claim 19 wherein each said selection set is defined by said player.

24. The method of claim 19 wherein at least one selection set is defined by said player and at least one selection set is randomly selected.

25. The method of claim 19 wherein each said selection set is randomly selected.

26. The method of claim 19 further comprising revealing said outcome set after the final sequential draw.

27. The method of claim 19 wherein said outcome set and said selection set are selected from a universe of indicia arranged into a matrix and said outcome set and said selection set are selected based on a predetermined location of said selections within said matrix.

28. The method of claim 27 wherein said matrix comprises a plurality of columns and said outcome set and said selection set each comprise one indicia selected from each column of said matrix.

29. The method of claim 27 wherein said step of awarding comprises issuing an award to said player only when every indicia of said outcome set is matched by said selection set.

30. The method of claim 27 wherein said step of awarding comprises issuing an award to said player when one or more indicia of said outcome set is matched by said selection set.

31. A method of conducting a game for a player, comprising:
receiving a wager from said player;
defining a selection set;
selecting an outcome set and concealing said outcome set from said player;
conducting a draw by comparing said selection set to said outcome set and determining the quantity of matches between said selection set and said outcome set;
the player opting whether to place an additional wager or end said draws;
if the player opts to place an additional wager, conducting at least one subsequent sequential draw, each subsequent sequential draw comprising:
defining a subsequent selection set for a subsequent sequential draw, said subsequent selection set containing any members of said selection set that matched said outcome set, if any, and excluding any non-matching members from the comparison of the selection set and the outcome set;
comparing said subsequent selection set to said outcome set and determining the quantity of matches between said subsequent selection set and said outcome set;
the player opting whether to place an additional wager or end said draws; and
if the player opts to place an additional wager, conducting another subsequent sequential draw; and
if said player has obtained a predetermined quantity of matches when the draws end, issuing an award to said player.

32. The method of claim 31 wherein said step of awarding comprises:
associating the quantity of matches obtained during each draw with payout odds; and
issuing an award for each draw based on the wager for that draw and the payout odds for the quantity of matches for that draw.

33. The method of claim 31 wherein said step of awarding comprises, after each draw, if a player opts to end said draws, issuing an award based on the sum of the wagers placed and the payout odds for the quantity of matches for that draw, but if a player opts to place an additional wager for a subsequent sequential draw, issuing no award for said draw and said player forfeiting the payout odds for the quantity of matches for that draw.

34. The method of claim 31 wherein said step of awarding comprises, after each draw, if a player opts to end said draws, issuing an award based on the wager placed for that draw and the payout odds for the quantity of matches for that draw, but if a player opts to place an additional wager for a subsequent sequential draw, issuing no award for said draw and said player forfeiting the payout odds for the quantity of matches for that draw and the wager for that draw.

35. The method of claim 31 further comprising:
after each draw, determining whether said player will be allowed to opt to place an additional wager based on the quantity of matches for that draw; and
if the player is not allowed to place an additional wager, ending said draws.

36. The method of claim 31 wherein each said selection set is defined by said player.

37. The method of claim 31 wherein at least one selection set is defined by said player and at least one selection set is randomly selected.

38. The method of claim 31 wherein each said selection set is randomly selected.

39. The method of claim 31 further comprising revealing said outcome set after said player opts to end said draws.

40. The method of claim 31 wherein said outcome set and said selection set are selected from a universe of indicia arranged into a matrix and said outcome set and said selection set are selected based on a predetermined location of said selections within said matrix.

41. The method of claim 40 wherein said matrix comprises a plurality of columns and said outcome set and said selection set each comprise one indicia selected from each column of said matrix.

42. The method of claim 40 wherein said step of awarding comprises issuing an award to said player only when every indicia of said outcome set is matched by said selection set.

43. The method of claim 40 wherein said step of awarding comprises issuing an award to said player when one or more indicia of said outcome set is matched by said selection set.

44. A method of conducting a game for a player, comprising:
receiving a wager from said player;
defining a selection set;
selecting an outcome set and concealing said outcome set from said player;
conducting a draw by comparing said selection set to said outcome set and determining the quantity of matches between said selection set and said outcome set;
after each draw, determining whether said player will be allowed to opt to place an additional wager based on the quantity of matches for that draw;
if the player is not allowed to place an additional wager, ending said draws;
if the player is allowed to place an additional wager, the player opting whether to place an additional wager or end said draws;
if the player opts to place an additional wager, conducting at least one subsequent sequential draw, each subsequent sequential draw comprising:
defining a subsequent selection set for a subsequent sequential draw, said subsequent selection set containing any members of said selection set that matched said outcome set, if any, and excluding any non-matching members from the comparison of the selection set and the outcome set;
comparing said subsequent selection set to said outcome set and determining the quantity of matches between said subsequent selection set and said outcome set;
determining whether said player will be allowed to opt to place an additional wager based on the quantity of matches for the draw;
if the player is not allowed to place an additional wager, ending said draws;
the player opting whether to place an additional wager or end said draws; and
if the player opts to place an additional wager, conducting another subsequent sequential draw; and
if said player has obtained a predetermined quantity of matches when the draws end, issuing an award to said player.

45. The method of claim 44 wherein said step of awarding comprises:
associating the quantity of matches obtained during each draw with payout odds; and
issuing an award for each draw based on the wager for that draw and the payout odds for the quantity of matches for that draw.

46. The method of claim 44 wherein said step of awarding comprises, after each draw, if a player opts to end said draws, issuing an award based on the sum of the wagers placed and the payout odds for the quantity of matches for that draw, but if a player opts to place an additional wager for a subsequent sequential draw, issuing no award for said draw and said player forfeiting the payout odds for the quantity of matches for that draw.

47. The method of claim 44 wherein said step of awarding comprises, after each draw, if a player opts to end said draws, issuing an award based on the wager placed for that draw and the payout odds for the quantity of matches for that draw, but if a player opts to place an additional wager for a subsequent sequential draw, issuing no award for said draw and said player forfeiting the payout odds for the quantity of matches for that draw and the wager for that draw.

48. The method of claim 44 wherein each said selection set is defined by said player.

49. The method of claim 44 wherein at least one selection set is defined by said player and at least one selection set is randomly selected.

50. The method of claim 44 wherein each said selection set is randomly selected.

51. The method of claim 44 further comprising revealing said outcome set after said player opts to end said draws.

52. The method of claim 44 wherein said outcome set and said selection set are selected from a universe of indicia arranged into a matrix and said outcome set and said selection set are selected based on a predetermined location of said selections within said matrix.

53. The method of claim 52 wherein said matrix comprises a plurality of columns and said outcome set and said selection set each comprise one indicia selected from each column of said matrix.

54. The method of claim 52 wherein said step of awarding comprises issuing an award to said player only when every indicia of said outcome set is matched by said selection set.

55. The method of claim 52 wherein said step of awarding comprises issuing an award to said player when one or more indicia of said outcome set is matched by said selection set.

56. A method of conducting a game for a player, comprising:

receiving at least one wager from said player;

defining a selection set;

selecting an outcome set and concealing said outcome set from said player;

comparing said selection set to said outcome set and determining the matches between said selection set and said outcome set;

conducting at least one sequential draw, each said draw comprising:

defining a subsequent selection set, said subsequent selection set containing a predefined finite quantity of members, said subsequent selection set including any members of any preceding selection set that matched said outcome set, if any, and excluding any non-matching members from the comparison of any preceding selection set and said outcome set; and comparing said subsequent selection set to said outcome set and determining the matches between said subsequent selection set and said outcome set; and if said player obtains a predetermined quantity of matches, issuing an award to said player.

* * * * *